United States Patent [19]
Craven

[11] 3,767,305
[45] Oct. 23, 1973

[54] RETRO-REFLEX VIEWER FOR DETECTING COUNTERFEIT IDENTITY CARDS

[75] Inventor: Jack L. Craven, Anaheim, Calif.

[73] Assignee: Electro-Photo Systems, Inc., Anaheim, Calif.

[22] Filed: Nov. 9, 1972

[21] Appl. No.: 305,102

[52] U.S. Cl................. 356/71, 350/236, 350/238, 356/256
[51] Int. Cl..................... G06k 9/00, G02b 27/02
[58] Field of Search ..........350/235–239, 243, 244; 356/71, 163–166, 168, 256; 250/219 DQ

[56] References Cited
UNITED STATES PATENTS
2,059,197  11/1936  Backer et al...................... 356/71 X
2,161,594  6/1939  Ruth ..................................... 356/71
2,488,146  11/1949  Steinhaus......................... 356/164 X Primary Examiner—David Schonberg
Assistant Examiner—F. L. Evans
Attorney—Lynn H. Latta

[57] ABSTRACT

A device for viewing identity cards and other documents having on their surfaces an overlay pattern of microscopically small beads which are normally invisible but which become visible by retro-reflection of a strong light projected on the retro-reflective surface within a casing which encloses the optical parts of the viewer so as to largely exclude ambient light rays. Any alteration of the card surface becomes apparent in a resultant degrading of the reflective surface.

8 Claims, 6 Drawing Figures

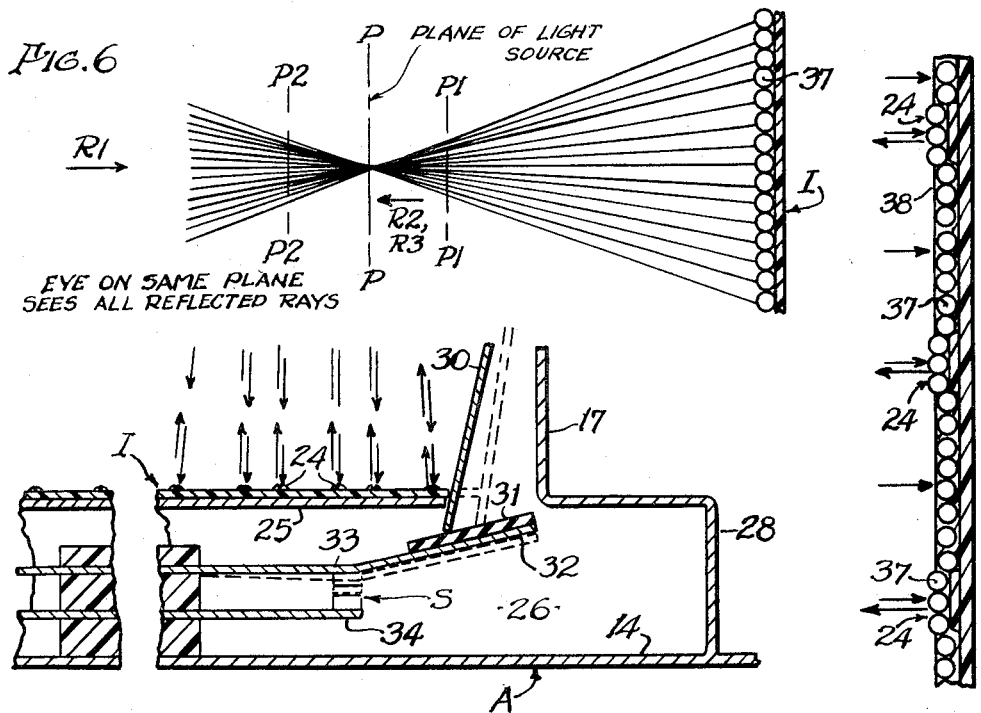
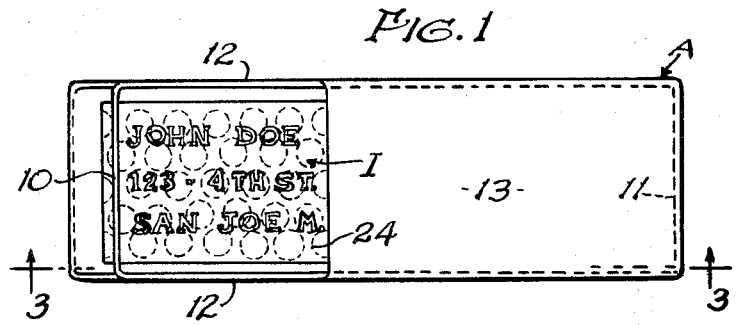

RETRO-REFLEX VIEWER FOR DETECTING COUNTERFEIT IDENTITY CARDS

BACKGROUND OF THE INVENTION

The principle of retro-reflection in which light is reflected to the source by reflection through spherical transparent beads is well known. A common application of the phenomenon is as road markers, caution signs, freeway exit markers, etc. Another familiar application of the retro-reflex principle is in the "beaded" projection screen for motion picture and transparent slide projection. It is reasonably well known that these devices operate efficiently only when the observer's eyes are observing the retro-reflex beads or beaded material within a very limited and narrow angle from the axis on which the light enters the beads. In addition, these devices only work well when the general (ambient) illumination is of less intensity than the light emanating from the source within that critical angle to the observer's eye. (General illumination or ambient illumination, as referred to herein, is defined as any light not coming from a controlled source located within the critical angle between the eye and the retro-reflex beads).

That the efficient retro-reflex angle is severely limited may be demonstrated by observing the projection of light from a single projector on a beaded screen in a darkened room. It will be noted that the screen is most bright when the eye is closest to the axis of the projection lens and that the brightness decreases as the observer moves away from the axis of the projection lamp. It will also be noted that the intensity of the reflection also decreases as the observer's position is moved forward and backward longitudinally in relation to the projector lens and that the retro-reflection appears at its brightest when the eye is located as close as possible to the lens both longitudinally and axially.

That the ambient light degrades the quality of the retro-reflection may be demonstrated by projecting a picture (controlled light) upon the beaded screen in a darkened room and then slowly increasing the ambient (uncontrolled) light level.

It will be observed that at some level the "uncontrolled" light degrades the projected image so greatly as to make the image unreadable, and that any uncontrolled light degrades the image to some extent.

New retro-reflex materials with microscopically small spherical beads are being made available for applications which will require that the retro-reflections be observable in relatively gigh ambient light. This material is typified by a thin layer of micro-reflex beads in a matrix for application on documents as a security measure. These new materials are produced with a technique that permits control of the reflectivity so that patterns, outlines of seals, or other security markings can be applied to documents, identification cards, drivers licenses, employee badges, etc. Any alteration of the card alters the reflective pattern in a manner to be visible under proper retro-reflex lighting conditions.

The new materials impose a limitation on eye location which was not important on road markers, and surveying. Surveying retro-reflectors, roadside markers and warning signs are intended to be viewed from distances which result in subtended viewing angles usually less than two or three degrees and since the retro-reflectors are not uniformly distributed over the whole viewing area and rather are intended to contrast with their background, it does not matter if an exaggerated unevenness of reflectivity occurs. This type of retro-reflection is considered satisfactory if the contrast between background and retro-reflection makes them visible. It is not required to discern the difference in reflectivity between one retro-reflex bead and another.

Since the new retro-reflex material is applied continuously across the document, the resulting subtended angle of viewing during normal observation of the card approaches 10° even on documents as small as 2 inches ×3 inches. Within this angle, the reflectivity must be uniform enough to clearly detect the intentional changes in the reflective pattern in order to read the security legends.

To increase the latitude of eye location it is well known that a reasonable compromise can be made in efficiency versus eye latitude by increasing the apparent or real size of the light source. Apparent and real "enlarged" light sources commonly known include optical condensor system, large diffused lamps, and diffusion plates interposed between clear lamps and a retro-reflex beam splitter. With these techniques, the acceptable lateral eye location increases in direct proportion to the apparent size of the light source and the acceptable longitudinal location of the eye increases as the rays from the light source to the retro-reflex material approach parallelism. Enlarged light sources act as if a large number of small lights were placed adjacent to one another and thereby increase the position from which retro-reflections may be observed. However, they are a compromise because they reduce the efficiency of the retro-reflections for two reasons: viz. (1) Any area of light distributed by a diffuser or controlled by a condenser lens system cannot be as bright per unit area as the original compact light source (filament or arc) and unlike in the restricted eye position, only a small portion of the total area is used at any one time resulting in a smaller ratio of the intensity being utilized, hence the retro-reflex image is of less intensity. (2) The increased size of the light source increases the ratio of uncontrolled light falling on the retro-reflective material in relation to the controlled light. In other words, each bundle of light not coincident with the eye pupil adds to the diffuse light which degrades the contrast by adding to the diffuse light being reflected from the low reflective areas in the security patterns.

The combination of lower light intensity by enlarging the light source with the reduction of contrast due to "uncontrolled" illumination creates a new problem by adding to the ambient light from outside of the optical system. In other words, the room light in which the viewing occurs may degrade the image beyond practical usability if the light source is enlarged.

RESUME' OF THE INVENTION

In dealing with the problems stated above, the present invention provides an identity card viewer having a strong light source operative within an ambient light excluding casing to project a light beam through a field lens which bends the rays toward parallelism so as to reduce their divergence, thence through a beam splitter which reflects the beam against the card along the viewing axis, and thence back along the viewing axis through the beam splitter and through a sight opening in the casing, to the viewer's eye, which sees a normally invisible overlay pattern on the face of the card by retro-reflex reflection from an overlay matrix of microscopically small spherical beads which is intensified over the reflection from the background areas of the card face. Ambient light is largely excluded by the casing which is completely closed around the optical components except for a small viewing window and a narrow slot for insertion of the card. Heating effect of the strong light source is minimized by utilizing a switch-closing device which is actuated by pressure of the edge of the inserted card to energize the light source, and which then expels the card as soon as the card is released, and simultaneously extinguishes the light.

To observe the reflective patterns in the retro-reflex material, a beam-splitter (semi-reflective mirror or pellicle) is interposed between the eye and the retro-reflex material, at an appropriate angle to the eye axis (e.g. 45°) and the light source is arranged so that its beam impinges on the side of the mirror toward the retro-reflex material.

The new material requires that any physically small light source be made to reasonably coincide with the pupil of the eye along the longitudinal axis of the line of sight. When the eye is moved too far in either direction longitudinally from the relative position of the light source, a hot spot will occure in the center of the retro-reflection. In the present invention, the distance from the eye (as applied to the casing viewing window) to the beam splitter is approximately the same as the distance from the field lens (the apparent light source) to the beam splitter. Thus the eye is "matched" to the size of the bundle of returning rays so that these rays will enter the eye properly.

Reasonably comfortable eye relief and latitude are obtained by maximum enclosure of the retro-reflex material to prevent the addition of ambient environmental light to the "controlled" viewing light. The invention provides for a fully enclosed card holder except for a narrow entry slot with a minimum viewing window, there to restrict the amount of environmental light to the most practical minimum.

In addition, making a practical retro-reflex viewing device for a small ID card requires that a fairly intense capacity light source be enclosed in a small space in order to both properly light the retro-reflex material and at the same time minimize ambient environmental light entry both through restricted size and reduced ventilation openings which results in lamp head dissipation problems. The invention provides an especially economical switch, incorporated into the retro-reflex material expulsion device so that the lamp only illuminates during the period that a card is held in place and thereby automatically extinquishes the heat generation of the lamp whenever not intentionally forced into the slot.

DESCRIPTION

The general object of the invention is to provide a satisfactorily operative viewer which can be utilized by markets, law-enforcement officials, and various commerical concerns for detecting counterfeiting of credit cards, vehicle license cards, and other identity cards, having a retro-reflective design, normally invisible, applied to the printed card surface. More specific objects will be apparent in the foregoing introductory material and in the ensuing specifications and appended drawings, wherein:

FIG. 1 is a plan view of a viewer embodying the invention;

FIG. 2 is an end view thereof;

FIG. 3 is a longitudinal sectional view of the same, taken on the line 3—3 of FIG. 1;

FIG. 4 is a highly magnified sectional view of an identity card having a retro-reflective surface with a security design which can be detected in the viewer;

FIG. 5 is a fragmentary enlarged sectional view of the switch actuator mechanism; and FIG. 6 is a schematic diagram illustrating the principle of matching the eye to the reflected light ray bundle.

Referring now to the drawing in detail, I have shown therein, as an example of one form in which the invention may be embodied, a table model viewer embodying, in general, a casing A pivotally mounted on a bracket or base B, a light source C, a field lens L and a beam-splitter M within the casing, and a normally open switch S for energizing the light source L when an identity card I is inserted into casing A. A current source, for energizing the light source, is shown at V. Optical components, including components C, L and M and a mirror M1, are arranged to project a light beam R on an identity card I, for viewing by an inspector's eye E applied to the viewer.

Casing A comprises front and back end walls 10 and 11, parallel side walls 12, a top wall 13 and a bottom 14, cooperating to provide a rectangular casing which is completely closed except for a viewing opening 15 and a card insertion slot 16 in top wall 13 and front wall 10 respectively. A partition 17 and lens L, mounted therein, divide the interior of casing A into a lamp chamber 18 and viewing chamber 19. Lamp C is mounted in an electric socket 20 affixed to bottom 14, and is centered beneath mirror M1 (e.g., a polished metal plate 21) which is mounted in the upper outer corner of chamber 18 in a position of inclination (e.g. 45°) such that the light beam R as projected from lamp C, will be reflected at right angles and centered on lens L. Beam splitter M (semi-reflective mirror or pellicle) consisting of a transparent sheet 22 and a coating 23 on the face thereof opposed to field lens L, is mounted in chamber 19 in a position of inclination (e.g. 45°) such that it is substantially centered on the major axis of beam R as delivered through field lens L, will reflect the beam downwardly as at R1 onto identity card I as placed in the casing for viewing, and will allow the light rays R2 reflected from card I to pass through it to the inspector's eye E, as indicated at R3, to an extent sufficient for the card I and the overlay design 24 thereon (FIG. 4) to be clearly seen by the eye E. The reflective coating 23 is such as to provide for a 50:50 splitting of beam R (50 percent reflection and 50 percent passing of the light rays).

Mirror M1 and beam-splitter M may be rectangular and mounted with their edges attached to casing ends 10 and 11. Together with partition 17, they extend the full width of chambers 18 and 19, so that none of the light rays will pass around their edges.

To cut off direct rays from lamp C to lens L, a light shield 39, traversing the chamber 18 between walls 12, is extended from partition 17 at one side of lens L substantially to lamp C, parallel to bottom 14.

Card insertion slot 16 is defined between the upper surface of a card supporting shelf 25 (extending between side walls 12 and spaced above bottom 14 to define a switch chamber 26 in which switch is mounted) and an apron 27 extending diagonally downwardly and inwardly from the lower margin of end wall 10. Apron 27 assists in guiding the identity card I into slot 16. An offset bottom portion of partition 17 at 28, provides an extension of the inner end of chamber 26, and is spaced from the end of shelf 25 to define a transverse slot 29. A switch actuator 30, consisting of a yieldable leaf spring blade having its upper end secured to partition 17, extends downwardly into slot 29, where its free lower end abuts a pad 31 of insulating material (FIG. 5) on the upper face of a lever 32 which is an extension of the free end of a movable contact 33 of switch S. Contact 33, embodying a spring blade, is self-loaded to an open position, out of engagement with a fixed contact 34 below it. Lever 32 is inclined upwardly toward partition offset 28 at an angle such that actuator blade 30, when sprung toward partition 17 by the inner end of a card I pushed through slot 16 by the inspector, will be operative, by camming action against pad 31, to depress the contact 33 into closed position engaging contact 34, thus closing a circuit 35 from voltage source V to lamp C as illustrated schematically in FIG. 1 and in FIG. 5, closing being indicated by dotted lines. When the card I is withdrawn through slot 16, actuator 30, with a spring action, will return to its normal position shown in full lines, and switch contact 33 will consequently spring back upwardly to its normally open position. The spring-action return movement of actuator 30 will also function to eject the card I through slot 16.

A pivot 36, connecting casing A to bracket B on a longitudinal axis of the casing, permits adjustment of the casing, as indicatd in dotted lines in FIG. 2, to a position suitably convenient for viewing.

Field lens L is such as to bend the diverging rays of light beam R into substantial parallism and to project an enlarged image of light source C, roughly equivalent to the lens area, on the coated face 23 of pellicle sheet 22, avoiding a "hot spot" at the center of the viewing area, and providing for maximum uniformity of light intensity in the beam R1 projected downwardly onto card I, and of the upwardly reflected beam R2 and the attenuated beam R3 passing through the beam-splitter to the eye E throughout the 10° angle of viewing mentioned above. Thus the entire area of card I between the lower edge of apron 27 and the inner end of the card, can be inspected for possible alteration which would alter the overlay design 24 by abrasion or covering up. The downardly projected beam R2 and the upwardly reflected beam R3 are substantially coaxial (though illustrated as being slightly spaced apart, for clarity of illustration) and thus the eye is substantially aligned with the light source, to provide for maximum visibility of the overly design 24.

Overlay matrix 24 is composed of a layer of microscopically small transparent beads 37 (e.g., of glass) of spherical form, coating the surface of card I and made more highly reflective in the design area 24 than in the background area. As a suggestion of how this could be accomplished, I have shown the background area as being covered by a coating 38 which is only moderately reflective as contrasted to the high reflectivity of matrix 24. However, it is contemplated that the card material that will be used with the invention, may be a retroreflective material manufactured by its developer, 3M company of Minneapolis, Minn., and which forms no part of the present invention except for its use with my improved viewer.

FIG. 6 illustrates schematically the importance of "Matching" the eye to the size of the ray bundle. Eye E, as applied to viewing opening 15, is substantially at the same distance as lens L from the center of reflection in beam splitter M, and thus can be said to be in the same plane P as the image of light source C as it exists on the face of lens L opposed to beam-splitter M. As thus positioned, the eye sees all reflected rays. If the eye should be ahead, in the plane P1, or behind, in the plane P2, the rays not entering the eye will cause lower intensity reflections at the edges of the retro-reflex surface 24, and the center of the area will appear as a "hot spot".

The lamp C provides a light source of such high intensity that its continuous operation would overheat the viewer. The self-opening of switch S by release of pressure on card I limits the operation of light source C to just the actual viewing interval.

It may be noted that the shield 39 is disposed at or near and parallel to a median longitudinal axis of casing A, the light source C being disposed on one side of (below) said axis, and the lens L, mirror M1 and beam-splitter M being located on the other side (above) such axis.

I claim:

1. A viewer for inspecting a retro-reflex security surface on an identity card, or the like, comprising:
    a casing having at one end a viewing opening and a card support in opposed relation, and having in said end a card-insertion slot at one end of said support;
    a beam-splitter in said casing between said viewing opening and said card support, disposed diagonally across a viewing axis extending between said opening and said support, said support being disposed at right angles to said axis;
    a transverse partition disposed between the ends of the casing and dividing it into a viewing chamber surrounding said axis in said one end of the casing, and a lamp chamber in the other end of the casing;
    a light source lamp in said lamp chamber;
    a mirror in said lamp chamber, in a diagonal position such as to reflect a light beam projected thereon on an axis substantially parallel to said partition, along a projection axis toward said partition at right angles thereto;
    and a field lens in said partition, in a plane at right angles to said projection axis and substantially centered thereon, operable to bend the rays of the reflected beam into substantial parallism and to transmit the bent rays to said beam splitter for reflection onto said security surface of an identity card inserted through said slot and resting against said support;
    said beam-splitter being operative to transmit rays reflected from said card through itself to said viewing opening along said viewing axis, and so inclined as to reflect the rays coming from said field lens also along said viewing axis, for maximum reflection of rays from said security surface to the viewers eye.

2. A viewer as defined in claim 1, said card insertion slot being only slightly wider than the thickness of the average identity card, with a width such as to freely receive the card.

3. A viewer as defined in claim 1, including a circuit for energizing said lamp and a switch, normally open, for closing said circuit in response to insertion of a card through said slot.

4. A viewer as defined in claim 3, including a switch actuator in the form of a leaf spring attached to said partition in a position opposed to said card-insertion slot, said actuator being yieldable under pressure of the inner end of an inserted card and operable to transmit closing movement to said swtich.

5. A viewer as defined in claim 4;
said casing including top and bottom walls;
said partition extending vertically between said top and bottom walls;
said viewing opening being located in said top wall above said viewing chamber;
said card support comprising a shelf at the bottom of said viewing chamber, in opposed relation to said viewing opening.

6. A viewer as defined in claim 5;
said card support shelf being spaced above said bottom wall to defined a switch chamber, and spaced horizontally from said partition to define a transverse slot;
said switch actuator spring projecting downwardly through said slot at its lower end;
said switch including a movable switch contact disposed beneath said shelf, and a lever extending from said contact to a position beneath said slot, in engagement with the lower end of said actuator spring so as to move said contact downwardly to a switch-closing position by camming action of said actuator spring thereagainst.

7. A viewer as defined in claim 1;
said casing having a longitudinal axis, said light source being disposed on one side of said axis and said mirror, lens and beam-splitter being located on the other side of said axis.

8. A viewer as defined in claim 7, including a light shield extending from said partition adjacent to said axis from the margin of said lens to said light source, to cut off direct rays from the light source to said lens.

* * * * *